US009159109B2

(12) United States Patent
Song et al.

(10) Patent No.: US 9,159,109 B2
(45) Date of Patent: Oct. 13, 2015

(54) METHOD AND APPARATUS FOR DETECTING STATUSES OF ENERGY SOURCE CONSUMPTION DEVICES

(71) Applicant: NEC (China) Co., Ltd., Beijing (CN)

(72) Inventors: Lei Song, Beijing (CN); Changjian Hu, Beijing (CN); Lu Yu, Beijing (CN); Kai Zhao, Beijing (CN)

(73) Assignee: NEC (CHINA) CO., LTD., Beijing (CN)

( * ) Notice: Subject to any disclaimer, the term of this patent is extended or adjusted under 35 U.S.C. 154(b) by 474 days.

(21) Appl. No.: 13/714,686

(22) Filed: Dec. 14, 2012

(65) Prior Publication Data

US 2013/0238155 A1     Sep. 12, 2013

(30) Foreign Application Priority Data

Mar. 6, 2012     (CN) .......................... 2012 1 0057549

(51) Int. Cl.
*G06Q 50/06*     (2012.01)
*G01D 4/00*     (2006.01)

(52) U.S. Cl.
CPC ................ *G06Q 50/06* (2013.01); *G01D 4/002* (2013.01); *Y02B 90/241* (2013.01); *Y04S 20/32* (2013.01); *Y04S 20/38* (2013.01)

(58) Field of Classification Search
CPC .................................................... G06Q 50/06
USPC ........................................................ 700/291
See application file for complete search history.

(56) References Cited

U.S. PATENT DOCUMENTS 8,396,686 B2 *   3/2013   Song et al. ................... 702/177
8,983,670 B2 *   3/2015   Shetty et al. ................. 700/291

(Continued)

FOREIGN PATENT DOCUMENTS

JP     2001330630 A     11/2001
JP     2006017456         1/2006
WO     WO0177696 A1     10/2001

OTHER PUBLICATIONS

Japanese Patent Office. "Notification of Reasons for Rejection" Office Action mailed on Feb. 12, 2014 for corresponding Japanese Patent Application. (6 Pages).

*Primary Examiner* — Robert Fennema
*Assistant Examiner* — Sivalingam Sivanesan
(74) *Attorney, Agent, or Firm* — Tutunjian & Bitetto, P.C.

(57) ABSTRACT

Embodiments of the invention disclose a method and apparatus for detecting the statuses of energy source consumption devices, relate to the field of energy source auditing and are intended to improve the efficiency and accuracy of detecting the statuses of the energy source consumption devices. In an inventive solution, mapping relationships between status combinations of respective energy source consumption devices measured by an energy meter and total energy consumption values of the respective energy source consumption devices in the status combinations are generated and stored in advance, and when the statuses of the respective energy source consumption devices are detected, the mapping relationships are directly searched for in each of which the difference between the included total energy consumption value and a total energy consumption value measured by the energy meter is below a predetermined threshold, and the current statuses of the respective energy source consumption devices are determined in the status combination in one of the found mapping relationships. With the invention, the efficiency and accuracy of detecting the statuses of the energy source consumption devices can be improved significantly.

24 Claims, 7 Drawing Sheets

(56) References Cited

U.S. PATENT DOCUMENTS

2010/0188262 A1* 7/2010 Reymann et al. ........ 340/870.02
2011/0125432 A1* 5/2011 Pomerantz et al. ............. 702/62
2012/0004784 A1* 1/2012 Oh et al. ....................... 700/291

* cited by examiner

METHOD AND APPARATUS FOR DETECTING STATUSES OF ENERGY SOURCE CONSUMPTION DEVICES

FIELD

The present invention relates to the field of energy source auditing and particularly to a method and apparatus for detecting the statuses of energy source consumption devices.

BACKGROUND

There is an increasing demand for energy sources throughout the world along with the global urbanization and modernization courses, especially the rapid development of the over-populated developing countries. Also numerous energy sources result from the combustion of minerals, and the extensive use of the energy sources will influence the environment in that the emission of greenhouse gas will result in global warming. Thus the efficient use and conservation of the energy sources is becoming an issue of great importance.

At present there are roughly two methods for energy saving. One method is to produce more efficient devices in using energy sources, and the other method is to reduce the consumption amount of energy sources through the persistent participation of device owners. As stated in the documents, the latter method may appear more feasible and can be accepted more easily due to a cost thereof far below that of the former method.

In order to enable device owners to participate in a persistent energy-saving process, an important issue is the knowledge of how people use their devices to thereby get rid of their bad routines of using energy sources or assist them in changing their own routines of using energy sources.

Thus the status of a power consumption device is detected, for example, the time for which the power consumption device is in an on/off or standby status, the time for which the power consumption device is in use, etc., and this is a technology of great importance to energy saving.

As illustrated in FIG. 1, there is currently the following scheme for detecting the statuses of power consumption devices:

In a first operation, a measurement value of a power electricity meter is stored in a power measurement storing unit, and other collected perceptive data, e.g., temperature, humidity, etc., and information of the devices is stored in an additional data storing unit;

In a second operation, a device status estimating unit estimates the statuses of the respective devices using the stored information above, assigns a probability value to the estimated status of each device and stores an estimation result in a device probable status and related probability storing unit; and In a third operation, a status acceptance decider compares the total power calculated from the status estimation result above with the total measured power. If the difference between the calculated total power and the total measured power is below a preset power threshold, then the status estimation result above is accepted and stores in a device status storing unit; otherwise, a status probability re-estimator defines the statuses of some devices according to the probability values obtained in the second operation and the decision condition of this operation and then the flow returns to the second operation where the device status estimating unit re-estimates the statuses of the devices according to the definition condition, thus resulting in a feedback loop.

An example will be described below:
Power measurement data stored in the power measurement storing unit is assumed as follows:

L = { "Time: 2011-11-1 12:34:23, Electricity Meter No. 1, Voltage: 220 V, Current: 23 mA",
 "Time: 2011-11-1 12:34:23, Electricity Meter No. 2, Voltage: 220 V, Current: 30 mA",
 "Time: 2011-11-1 12:34:26, Electricity Meter No. 1, Voltage: 220 V, m Current: 10 mA",
 ... ...
}

Additional data stored in the additional data storing unit is assumed as follows:

A = {"Device No.: 1, 30w/h, Use Mode: Always from 6p.m to 9p.m",
 "Device No.: 2, 10w/h, Use Mode: Always from 6a.m to 7a.m",
 "Device No.: 3, 25w/h, Use Mode: Always from 6a.m to 7a.m",
 "Temperature: 23.2 at 2011-11-1 12:34:23",
 "Humidity: 30% at 2011-11-1 12:34:23"
 ... ...
}

Whether the devices are in an on or off status and corresponding probability values may be inferred from the information above, particularly as follows:

O1= {Device No. 1: Off with 20%,
 Device No. 2: Off with 40%,
 Device No. 3: On with 80%, ...
}

The total power is estimated from O1 and A as 30×0+10×0+25×1=25w. Given the total measured power of 35w and a given threshold of 5w, the estimation result above can not be accepted due to 35w−25w=10>5w.

The status probability re-estimator defines the device No. 3 in an on status according to the probability values (because the device No. 3 is in an on status with the probability of 80%) and notifies the device status estimating unit of the definition result, and the device status estimating unit re-estimates the statuses of the devices as the following new estimation result:

O2= {Device No. 1: Off with 20%,
 Device No. 2: Off with 90%,
 Device No. 3: On with 80%, ...
}

The status acceptance decider compares the total power estimated from the result above of O2 with the total measured power. The estimated total power is 25+10=35w, and the total measured power is also 35w, so the difference between them is zero and below the given threshold. Thus the result can be accepted and outputted as:

O={Device No. 1: Off, Device No. 2: On, Device No. 3: On}.

The foregoing scheme for detecting the statuses of devices has to be performed inefficiently with a number of feedback loops. A problem currently desirable to be addressed is how to improve the efficiency of detecting the statuses of devices.

SUMMARY

Embodiments of the invention provide a method and apparatus for detecting the statuses of energy source consumption devices to improve the efficiency of detecting the statuses of the energy source consumption devices.

A method for detecting the statuses of energy source consumption devices includes:

reading a total energy consumption value measured by an energy meter and a set of status combinations preset for the energy meter, where the set of status combinations include mapping relationships between status combinations and total energy consumption values, the status combinations in the respective mapping relationships include status information of respective energy source consumption devices measured by the energy meter, and the total energy consumption values in the respective mapping relationships are total energy consumption values of the respective energy source consumption devices pre-estimated in the corresponding status combinations;

searching the set of status combinations for mapping relationships in each of which the difference between the included total energy consumption value and the read total energy consumption value is below a predetermined threshold; and selecting one of the found mapping relationships, and determining the current statuses of the respective energy source consumption devices according to the status combination in the selected mapping relationship.

An apparatus for detecting the statuses of energy source consumption devices includes:

an energy measurement value storing unit configured to store a total energy consumption value measured by an energy meter;

a set of status combinations storing unit configured to store a set of status combinations preset for the energy meter, where the set of status combinations include mapping relationships between status combinations and total energy consumption values, the status combinations in the respective mapping relationships include status information of respective energy source consumption devices measured by the energy meter, and the total energy consumption values in the respective mapping relationships are total energy consumption values of the respective energy source consumption devices pre-estimated in the corresponding status combinations;

a status estimating unit configured to read the total energy consumption value stored in the energy measurement value storing unit and the set of status combinations stored in the set of status combinations storing unit and to search the set of status combinations for mapping relationships in each of which the difference between the included total energy consumption value and the read total energy consumption value is below a predetermined threshold;

a status selecting unit configured to select one of the found mapping relationships; and a status determining unit configured to determine the current statuses of the respective energy source consumption devices according to the status combination in the selected mapping relationship.

In the solutions of the embodiments of the invention above, mapping relationships between status combinations of respective energy source consumption devices measured by an energy meter and total energy consumption values of the respective energy source consumption devices in the status combinations are generated and stored in advance, and when the statuses of the respective energy source consumption devices are detected, mapping relationships, in each of which the difference between the included total energy consumption value and a total energy consumption value measured by the energy meter is below a predetermined threshold, are directly searched for, and the current statuses of the respective energy source consumption devices are determined according to the status combination in one of the found mapping relationships. As compared with the prior art, the solutions dispense with a number of feedback loops to thereby improve significantly the efficiency of detecting the statuses of the energy source consumption devices.

Embodiments of the invention further provide another method and apparatus for detecting the statuses of energy source consumption devices to improve the accuracy of detecting the statuses of the energy source consumption devices.

A method for detecting the statuses of energy source consumption devices includes:

reading a current load tree in which energy meters are arranged on a root node and on at least one non-root node;

decomposing the read load tree into a plurality of sub-trees in each of which an energy meter is arranged on a root node and no energy meter is arranged on any non-root node;

for each sub-tree, calculating an entropy to characterize the differentiation of energy consumption between energy source consumption devices under the sub-tree, and determining priorities of the respective sub-trees from the calculated entropies so that the sub-tree with the larger differentiation of energy consumption between the energy source consumption devices has a higher priority; and detecting the statues of the energy source consumption devices under the respective sub-trees respectively in a descending order of the priorities.

An apparatus for detecting the statuses of energy source consumption devices includes:

a load tree storing unit configured to store a load tree in which energy meters are arranged on a root node and on at least one non-root node;

a sub-treeing unit configured to read the load tree stored in the load tree storing unit and to decompose the read load tree into a plurality of sub-trees in each of which an energy meter is arranged on a root node and no energy meter is arranged on any non-root node;

an entropy calculating unit configured, for each sub-tree, to calculate an entropy to characterize the differentiation of energy consumption between energy source consumption devices under the sub-tree;

a priority determining unit configured to determine priorities of the respective sub-trees from the calculated entropies so that the sub-tree with the larger differentiation of energy consumption between the energy source consumption devices has a higher priority; and a status detecting unit configured to detect the statues of the energy source consumption devices under the respective sub-trees respectively in a descending order of the priorities.

In the solutions of the embodiments of the invention above, a load tree is decomposed into sub-trees with energy meters arranged only on root nodes; then for each sub-tree, an entropy is calculated to characterize the differentiation of energy consumption between energy source consumption devices under the sub-tree, and priorities of the respective sub-trees are determined from the calculated entropies so that the sub-tree with the larger differentiation of energy consumption between the energy source consumption devices has a higher priority; and next the statues of the energy source consumption devices under the respective sub-trees are detected respectively in a descending order of the priorities. Since the statuses of the energy source consumption devices with larger differentiation of energy consumption are detected at higher accuracy, the solutions detect the statuses of the energy source consumption devices preferentially for the sub-tree with larger differentiation of energy consumption between the energy source consumption devices and can avoid an error of detecting the statuses of the energy source consumption devices from being passed to thereby improve the accuracy of detecting the statuses of the energy source consumption devices.

DETAILED DESCRIPTION OF THE EMBODIMENTS

In order to improve the efficiency of detecting the statuses of energy source consumption devices, an embodiment of the invention provides a method for detecting the statuses of energy source consumption devices, and in this method, mapping relationships between status combinations of respective energy source consumption devices measured by an energy meter and total energy consumption values of the respective energy source consumption devices in the status combinations are generated and stored in advance, and when the statuses of the respective energy source consumption devices are detected, mapping relationships, in each of which the difference between the included total energy consumption value and a total energy consumption value measured by the energy meter is below a predetermined threshold, are directly searched for, and the current statuses of the respective energy source consumption devices are determined according to the status combination in one of the found mapping relationships.

Figure 1:
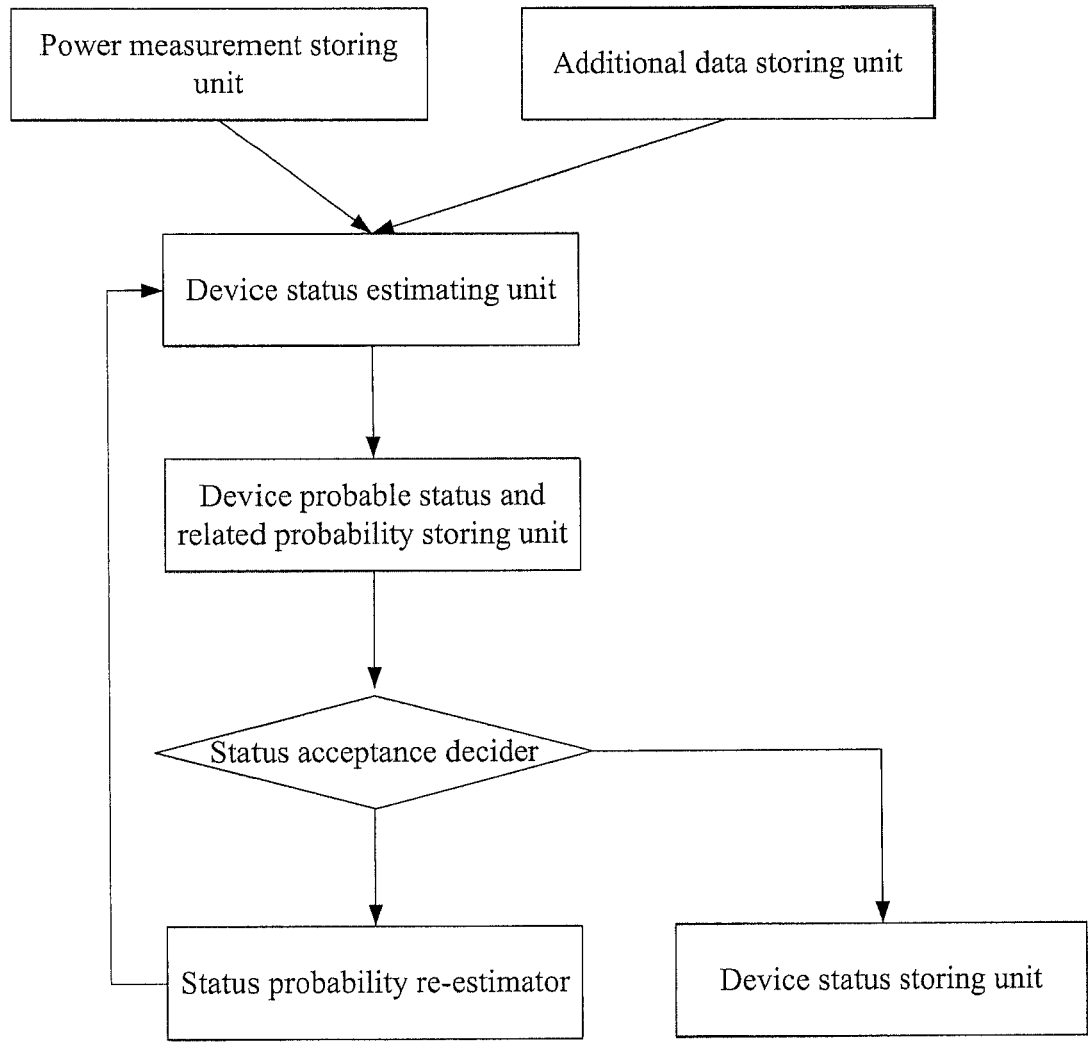
FIG. 1 is a schematic flow chart of detecting the statuses of devices in the prior art.
Figure 2:
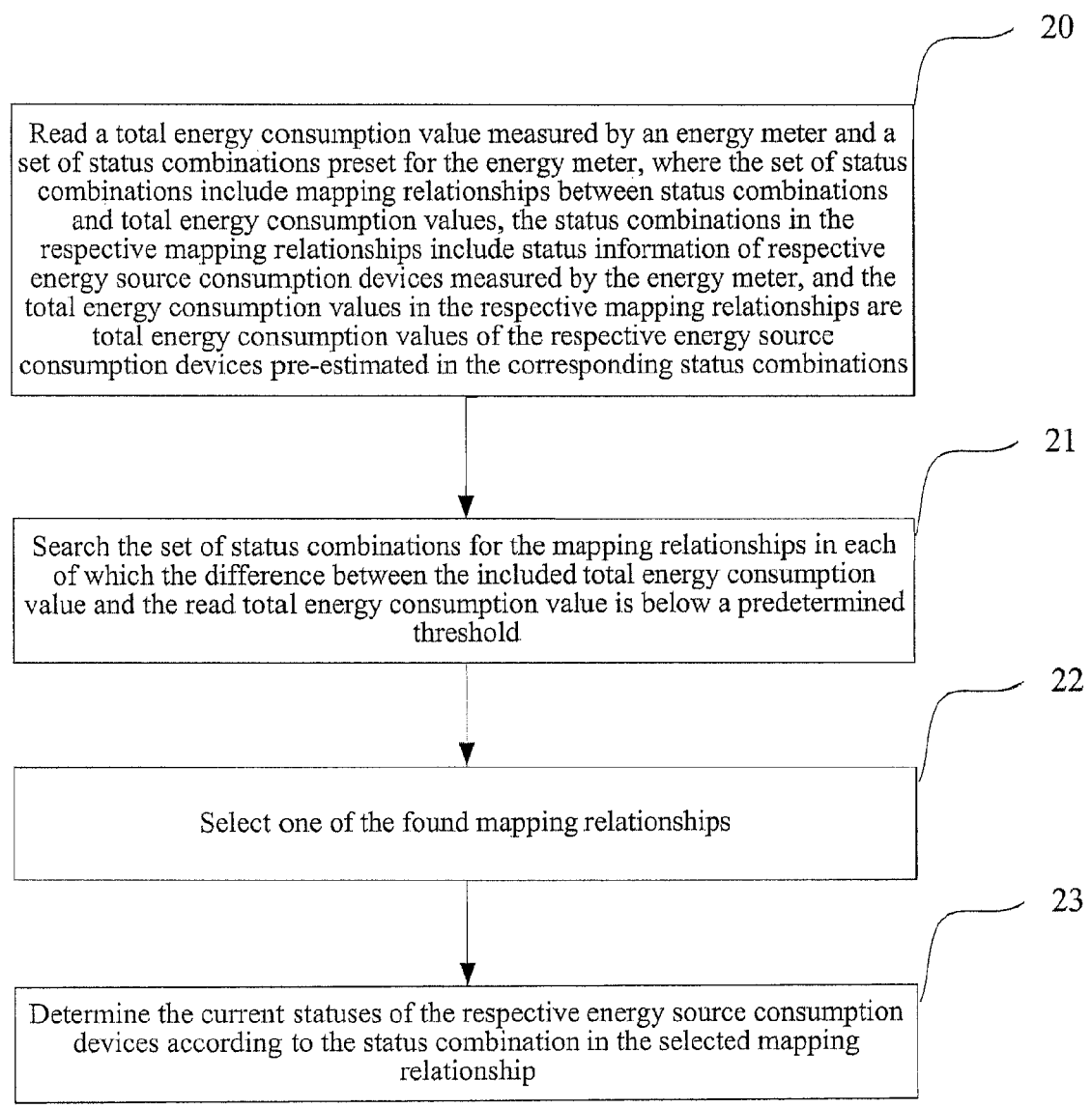
FIG. 2 is a schematic flow chart of a method according to an embodiment of the invention.

Referring to FIG. 2, a method for detecting the statuses of energy source consumption devices according to an embodiment of the invention includes the following operations 20 to 23.

The operation 20 is to read a total energy consumption value measured by an energy meter and a set of status combinations preset for the energy meter, where the set of status combinations include mapping relationships between status combinations and total energy consumption values, the status combinations in the respective mapping relationships include status information of respective energy source consumption devices measured by the energy meter, and the total energy consumption values in the respective mapping relationships are total energy consumption values of the respective energy source consumption devices pre-estimated in the corresponding status combinations; and the energy meter in the invention may be a power electricity meter and so on, and the total energy consumption values may be total power values;

The operation 21 is to search the set of status combinations for the mapping relationships in each of which the difference between the included total energy consumption value and the read total energy consumption value is below a predetermined threshold;

The operation 22 is to select one of the found mapping relationships; and

The operation 23 is to determine the current statuses of the respective energy source consumption devices according to the status combination in the selected mapping relationship.

For the first time to detect the statuses, the set of status combinations is generated as follows before the operation 20:

All probable status combinations of the respective energy source consumption devices are determined; and here if the number of the respective energy source consumption devices is N, then the number of all the probable status combinations of the respective energy source consumption devices are $2^N$;

For each determined status combination, the total energy consumption value of the respective energy source consumption devices in the status combination is estimated according to energy consumption parameter values of the respective energy source consumption devices, and the mapping relationship between the status combination and the estimated total energy consumption value is stored in the set of status combinations. Here when the total energy consumption value of the respective energy source consumption devices in the status combination is estimated, firstly energy consumption values of the respective energy source consumption devices in corresponding statuses may be determined from the energy consumption parameter values of the respective energy source consumption devices, for example, if the status of an energy source consumption device is off, then the energy consumption value of the energy source consumption device in the status is 0, and if the status of the energy source consumption device is on, then the energy consumption value of the energy source consumption device in the status is K (K is above 0) watts; and then the energy consumption values of the respective energy source consumption devices in the corresponding statuses are summed and the resulting value can be taken as the total energy consumption value of the respective energy source consumption devices in the status combination.

Preferably after the mapping relationship between each determined status combination and the corresponding total energy consumption value is stored in the set of status combinations, the respective mapping relationships can be sorted in an order of the magnitudes of the total energy consumption values in the respective mapping relationships in the set of status combinations, for example, the respective mapping relationships can be sorted in a descending or ascending order of the total energy consumption values, in order to improve the efficiency of a subsequent search.

In the operation 22, one of the found mapping relationships may be selected particularly in the following three alternatives:

The first one, for each found mapping relationship, a first weight corresponding to the mapping relationship is firstly calculated according to the difference between the total energy consumption value in the mapping relationship and the read total energy consumption value, where the first weight represents the magnitude of the probability that a real current status combination of the respective energy source consumption devices is the status combination in the mapping relationship. Here the first weights corresponding to the respective found mapping relationships can be calculated using a specific monotonously decreasing function, and preferably the function shall ensure that the larger the difference between the total energy consumption value in the mapping relationship and the read total energy consumption value is, the lower the probability reflected by the calculated first weight is. For example, the function is First Weight=(1−(Sequence Number−1)/10), where the found mapping relationships are sorted in an ascending order of the magnitudes of the differences and given corresponding sequence numbers, and the larger first weight represents the higher probability that the real current status combination of the respective energy source consumption devices is the status combination in the mapping relationship; and Then the mapping relationship with the highest probability is selected from the respective found mapping relationships according to the calculated first weights.

The second one, the stored probable status combinations of the respective energy source consumption devices at a last moment of time are firstly read; and here the probable status combinations of the respective energy source consumption devices at a last moment of time refer to the status combinations in the respective mapping relationships found in the operation 21 or the status combination in the mapping relationship selected in the operation 22 when the statuses of the respective energy source consumption devices were detected last time in this method;

Then for each found mapping relationship, the numbers of energy source consumption devices to be changed in status among the respective energy source consumption devices when the respective read status combinations are converted into the status combination in the found mapping relationship are determined, and a second weight corresponding to the found mapping relationship is calculated from the determined numbers, where the second weight represents the magnitude of the probability that a real current status combination of the respective energy source consumption devices is the status combination in the found mapping relationship. For example, if the statuses of three energy source consumption devices in a read status combination are on, off and on respectively and the statuses of the three energy source consumption devices in the status combination of the found mapping relationship are off, on and on respectively, then the number of energy source consumption devices to be changed in status among the three energy source consumption devices is 2 when the read status combination is converted into the status combination in the found mapping relationship; and Then the mapping relationship with the highest probability is selected from the respective found mapping relationships according to the calculated second weights.

The third one, for each found mapping relationship, a first weight corresponding to the mapping relationship is firstly calculated according to the difference between the total energy consumption value in the mapping relationship and the read total energy consumption value, where the first weight represents the magnitude of the probability that a real current status combination of the respective energy source consumption devices is the status combination in the mapping relationship;

Then the stored probable status combinations of the respective energy source consumption devices at a last moment of time are firstly read, and for each found mapping relationship, the numbers of energy source consumption devices to be changed in status among the respective energy source consumption devices when the respective read status combinations are converted into the status combination in the found mapping relationship are determined, and a second weight corresponding to the found mapping relationship is calculated from the determined numbers, where the second weight represents the magnitude of the probability that a real current status combination of the respective energy source consumption devices is the status combination in the found mapping relationship; and Lastly the mapping relationship with the highest probability is selected from the respective found mapping relationships according to the calculated first weights and second weights.

Specifically the second weight corresponding to the found mapping relationship may be calculated from the determined numbers in the second and third alternatives particularly as follows:

For each read status combination, the number of energy source consumption devices to be changed in status among the respective energy source consumption devices when the read status combination is converted into the status combination in the found mapping relationship is determined, and a third weight representing the probability that the respective energy source consumption devices undergo this status combination conversion is calculated from the determined number; and here the third weight can be calculated using a specific function, and preferably the larger the number of energy source consumption devices to be changed in status among the respective energy source consumption devices is, the lower the probability reflected by the calculated third weight that the respective energy source consumption devices undergo the corresponding status combination conversion is, for example, the function may be Third Weight=1−(Number of Energy Source Consumption Devices to Be Changed in Status among Respective Energy source Consumption Devices)/(Number of the respective Energy source Consumption Devices); and then the larger third weight represents the higher probability that the respective energy source consumption devices undergo the corresponding status combination conversion; and Then the third weight representing the highest probability that a corresponding status combination conversion is performed is selected from the respective calculated third weights, and the second weight corresponding to the found mapping relationship is determined as the selected third weight.

Specifically the mapping relationship with the highest probability may be selected from the respective found mapping relationships according to the calculated first weights and second weights in the third alternative particularly as follows:

For each found mapping relationship, a fourth weight is calculated firstly from the first weight and the second weight corresponding to the mapping relationship, where the fourth weight represents the magnitude of the final probability that the real current status combination of the respective energy source consumption devices is the status combination in the mapping relationship. For example, the first weight corresponding to the mapping relationship calculated in current detection of the statuses, the first weight corresponding to the mapping relationship calculated in last detection of the statuses and the second weight corresponding to the mapping relationship calculated in the current detection of the statuses are summed as the fourth weight; and Then the mapping relationship with the highest corresponding final probability is selected from the respective found mapping relationships according to the calculated fourth weights.

Preferably the respective mapping relationships and corresponding first weights calculated in the current detection of the statuses shall be stored for next detection of the statuses.

In order to improve the accuracy of detecting the statuses of energy source consumption devices, an embodiment of the invention provides a method for detecting the statuses of energy source consumption devices, and in this method, a load tree is decomposed into sub-trees with energy meters arranged only on root nodes; then for each sub-tree, an entropy is calculated to characterize the differentiation of energy consumption between energy source consumption devices under the sub-tree, and priorities of the respective sub-trees are determined from the calculated entropies so that the sub-tree with the larger differentiation of energy consumption between the energy source consumption devices has a higher priority; and next the statues of the energy source consumption devices under the respective sub-trees are detected respectively in a descending order of the priorities.

Figure 3:
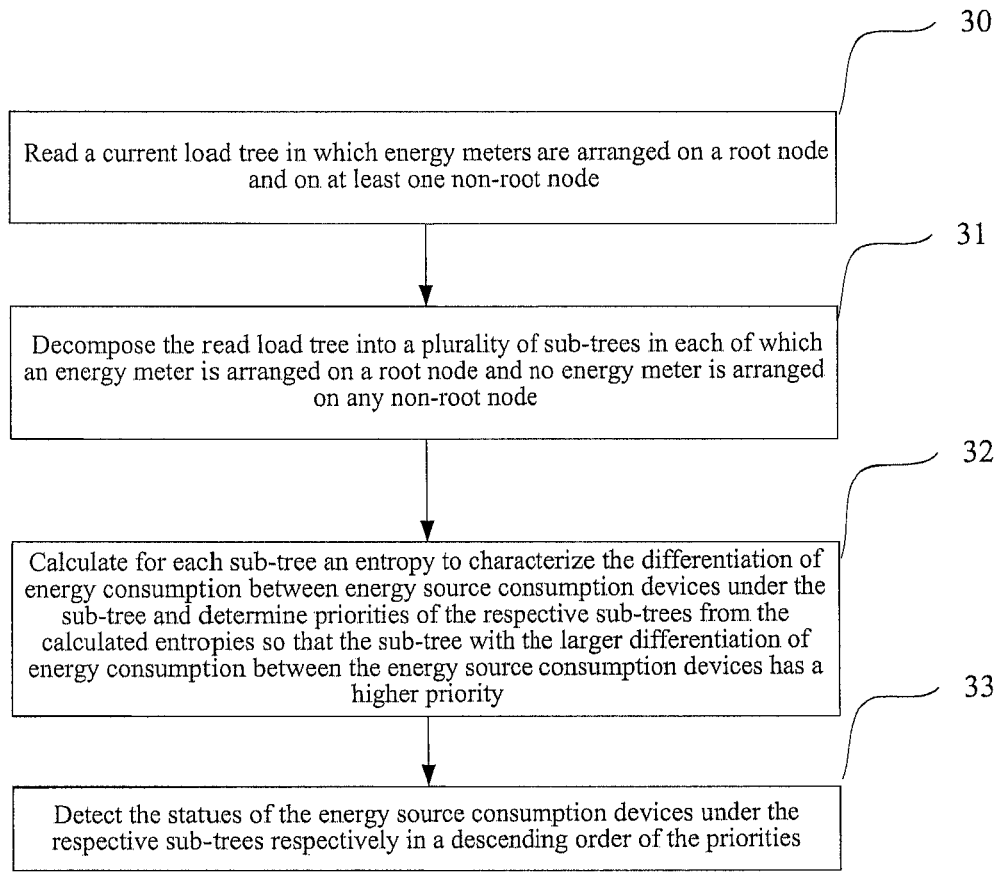
FIG. 3 is a schematic flow chart of another method according to an embodiment of the invention.

Referring to FIG. 3, a method for detecting the statuses of energy source consumption devices according to an embodiment of the invention includes the following operations 30 to 33.

The operation 30 is to read a current load tree with energy meters arranged on a root node and on at least one non-root node; and here the load tree represents a tree-like structure of power consumption loads of a local power grid, and other nodes than the leaf nodes in the load tree represent energy switching devices while the leaf nodes in the load tree represent energy source consumption devices, where the power energy switching device is a device capable of enabling an energy source consumption device to be provided with an energy source, e.g., a socket, etc.

The operation 31 is to decompose the read load tree into a plurality of sub-trees in each of which an energy meter is arranged on a root node and no energy meter is arranged on any non-root node;

The operation 32 is to calculate for each sub-tree an entropy to characterize the differentiation of energy consumption between energy source consumption devices under the sub-tree and to determine priorities of the respective sub-trees from the calculated entropies so that the sub-tree with the larger differentiation of energy consumption between the energy source consumption devices has a higher priority; and The operation 33 is to detect the statues of the energy source consumption devices under the respective sub-trees respectively in a descending order of the priorities.

In the operation 31, the read load tree may be decomposed into a plurality of sub-trees particularly as follows:

A. The sub-trees with root nodes being nodes arranged with energy meters are picked out of the current load tree; and B. For each picked sub-tree, it is determined whether there is a non-root node arranged with an energy meter in the sub-tree, and if so, the sub-tree is taken as the current load tree, and the process returns to the operation A; otherwise, the sub-tree is outputted as a result.

In the operation 32, the entropy to characterize the differentiation of energy consumption between the energy source consumption devices under the sub-tree may be calculated particularly as follows:

Respective probable total energy consumption values of all the energy source consumption devices under the sub-tree are determined from energy consumption parameter values of the respective energy source consumption devices under the sub-tree, and the number of status combinations corresponding to each probable total energy consumption value is determined, where the status combinations each include status information of the respective energy source consumption devices under the sub-tree upon reaching the corresponding total energy consumption value. Specifically respective probable status combinations of all the energy source consumption devices under the sub-tree can be firstly determined, and for each determined status combination, the total energy consumption value of all the energy source consumption devices in the status combination can be estimated according to the energy consumption parameter values of the respective energy source consumption devices; and then the number of status combinations corresponding to each total energy consumption value can be determined. For example, there are 8 respective probable status combinations of all the energy source consumption devices under the sub-tree, and the total energy consumption values corresponding to the respective status combinations are 0w, 10w, 20w, 30w, 40w, 10w, 20w and 30w respectively, then the number of status combinations corresponding to 0w is 1, the number of status combinations corresponding to 10w is 2, the number of status combinations corresponding to 20w is 2, the number of status combinations corresponding to 3w is 2, and the number of status combinations corresponding to 40w is 1.

The entropy (EPN) to characterize the differentiation of energy consumption between the energy source consumption devices under the sub-tree is calculated in the formulas of:

$$EPN = \frac{1}{A}\sum_{t=1}^{B} -\frac{N_t}{A}\log\frac{N_t}{A};$$

Where A is the total number of energy source consumption devices under the sub-tree, B is the number of all the probable total energy consumption values of all the energy source consumption devices under the sub-tree, and $N_t$ is the number of status combinations corresponding to the t-th probable total energy consumption value of all the energy source consumption devices under the sub-tree.

In the operation 33, the statuses of the energy source consumption devices under the respective sub-trees may be detected particularly as follows:

A total energy consumption value of respective energy source consumption devices under a current sub-tree measured by the energy meter arranged on the root node of the sub-tree and a set of status combinations preset for the energy meter are read, where the set of status combinations include mapping relationships between status combinations and total energy consumption values, the status combinations in the respective mapping relationships include status information of the respective energy source consumption devices, and the total energy consumption values in the respective mapping relationships are total energy consumption values of the respective energy source consumption devices pre-estimated in the corresponding status combinations;

The set of status combinations is searched for the mapping relationships in each of which the difference between the included total energy consumption value and the read total energy consumption value is below a predetermined threshold; and One of the found mapping relationships is selected, and the current statuses of the respective energy source consumption devices are determined according to the status combination in the selected mapping relationship.

Furthermore before the total energy consumption value of the respective energy source consumption devices measured by the energy meter and the set of status combinations preset for the energy meter are read, all the probable status combinations of the respective energy source consumption devices can be determined; and for each determined status combination, the total energy consumption value of the respective energy source consumption devices in the status combination is estimated according to energy consumption parameter values of the respective energy source consumption devices, and the mapping relationship between the status combination and the estimated total energy consumption value is stored in the set of status combinations.

Specifically one of the found mapping relationships may be selected particularly in the following three alternatives:

The first one, for each found mapping relationship, a first weight corresponding to the mapping relationship is calculated according to the difference between the total energy consumption value in the mapping relationship and the read total energy consumption value, where the first weight represents the magnitude of the probability that a real current status combination of the respective energy source consumption devices is the status combination in the mapping relationship; and The mapping relationship with the highest probability is selected from the respective found mapping relationships according to the calculated first weights.

The second one, the stored probable status combinations of the respective energy source consumption devices at a last moment of time are read;

For each found mapping relationship, the numbers of energy source consumption devices to be changed in status among the respective energy source consumption devices when the respective read status combinations are converted into the status combination in the found mapping relationship are determined, and a second weight corresponding to the found mapping relationship is calculated from the determined numbers, where the second weight represents the magnitude of the probability that a real current status combination of the respective energy source consumption devices is the status combination in the found mapping relationship; and The mapping relationship with the highest probability is selected from the respective found mapping relationships according to the calculated second weights.

The third one, for each found mapping relationship, a first weight corresponding to the mapping relationship is calculated according to the difference between the total energy consumption value in the mapping relationship and the read total energy consumption value, where the first weight represents the magnitude of the probability that a real current status combination of the respective energy source consumption devices is the status combination in the mapping relationship;

The stored probable status combinations of the respective energy source consumption devices at a last moment of time are read, and for each found mapping relationship, the numbers of energy source consumption devices to be changed in status among the respective energy source consumption devices when the respective read status combinations are converted into the status combination in the found mapping relationship are determined, and a second weight corresponding to the found mapping relationship is calculated from the determined numbers, where the second weight represents the magnitude of the probability that a real current status combination of the respective energy source consumption devices is the status combination in the found mapping relationship; and The mapping relationship with the highest probability is selected from the respective found mapping relationships according to the calculated first weights and second weights.

Specifically the second weight corresponding to the mapping relationship may be calculated from the determined numbers in the second and third alternatives particularly as follows:

For each read status combination, the number of energy source consumption devices to be changed in status among the respective energy source consumption devices when the read status combination is converted into the status combination in the found mapping relationship is determined, and a third weight representing the probability that the respective energy source consumption devices undergo this status combination conversion is calculated from the determined number; and The third weight representing the highest probability that a corresponding status combination conversion is performed is selected from the respective calculated third weights, and the second weight corresponding to the found mapping relationship is determined as the selected third weight.

Specifically the mapping relationship with the highest probability may be selected from the respective found mapping relationships according to the calculated first weights and second weights in the third alternative particularly as follows:

For each found mapping relationship, a fourth weight is calculated from the first weight and the second weight corresponding to the mapping relationship; and The mapping relationship with the largest corresponding fourth weight is selected from the respective found mapping relationships.

First Embodiment

Figure 4A:
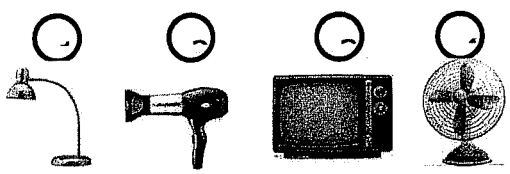
FIG. 4A is a schematic diagram of devices to be detected in a first embodiment of the invention.

As illustrated in FIG. 4A, there are four energy source consumption devices under a power electricity meter in this embodiment, energy consumption parameters values, i.e., power values, of the respective energy source consumption devices are as depicted in Table 1 below:

TABLE 1

| Energy source consumption device ID | Power value |
|---|---|
| 1 | 20 w |
| 2 | 800 w |
| 3 | 90 w |
| 4 | 30 w |

Figure 4B:
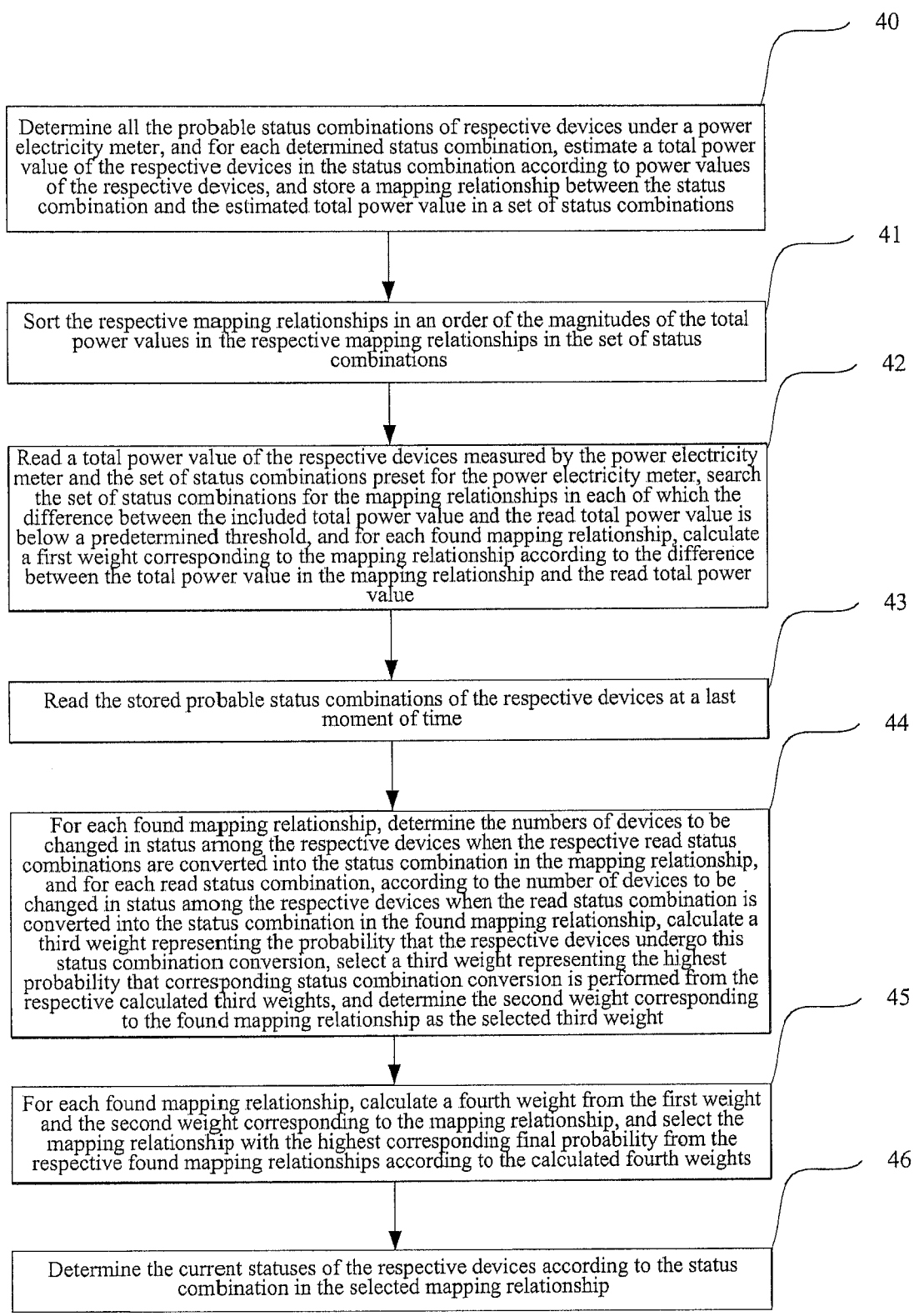
FIG. 4B is a schematic flow chart of detecting the statuses according to the first embodiment of the invention.

As illustrated in FIG. 4B, a specific flow of detecting the statuses of energy source consumption devices is as follows:

An operation 40 is to determine all the probable status combinations of respective energy source consumption devices under a power electricity meter, and for each determined status combination, to estimate a total power value of the respective energy source consumption devices in the status combination according to power values of the respective energy source consumption devices, and to store a mapping relationship between the status combination and the estimated total power value in a set of status combinations;

Specifically the set of status combinations as depicted in Table 2 below results from all the probable status combinations of the four energy source consumption devices and the total power values corresponding to the respective status combinations resulting from Table 1:

TABLE 2

| Status combination | Total power value | Status combination | Total power value |
|---|---|---|---|
| 0000 | 0 | 0001 | 20 w |
| 0010 | 800 w | 0011 | 820 w |
| 0100 | 90 w | 0101 | 110 w |
| 0110 | 890 w | 0111 | 910 w |
| 1000 | 30 w | 1001 | 50 w |
| 1010 | 830 w | 1011 | 850 w |

TABLE 2-continued

| Status combination | Total power value | Status combination | Total power value |
|---|---|---|---|
| 1100 | 120 w | 1101 | 140 w |
| 1110 | 920 w | 1111 | 940 w |

An operation 41 is to sort the respective mapping relationships in an order of the magnitudes of the total power values in the respective mapping relationships in the set of status combinations;

Specifically the respective mapping relationships in Table 2 are sorted in an ascending order of the total energy consumption values as Table 3 below:

TABLE 3

| Status combination | Total power value | Status combination | Total power value |
|---|---|---|---|
| 0000 | 0 | 0010 | 800 w |
| 0001 | 20 w | 0011 | 820 w |
| 1000 | 30 w | 1010 | 830 w |
| 1001 | 50 w | 1011 | 850 w |
| 0100 | 90 w | 0110 | 890 w |
| 0101 | 110 w | 0111 | 910 w |
| 1100 | 120 w | 1110 | 920 w |
| 1101 | 140 w | 1111 | 940 w |

An operation 42 is to read a total power value of the respective energy source consumption devices measured by the power electricity meter and the set of status combinations preset for the power electricity meter, to search the set of status combinations for the mapping relationships in each of which the difference between the included total power value and the read total power value is below a predetermined threshold, and for each found mapping relationship, to calculate a first weight corresponding to the mapping relationship according to the difference between the total power value in the mapping relationship and the read total power value;

Specifically a total power value of the four energy source consumption devices measured by the power electricity meter is read, Table 3 is searched for the mapping relationships in each of which the difference between the included total power value and the read total power value is below a predetermined threshold, and the first weights corresponding to the respective found mapping relationships are calculated. Given the total power value 120w of the four energy source consumption devices measured by the power electricity meter, the predetermined value of 20w and the first weight calculated using the function of First Weight F0=1-(Sequence Number-1)/10, then the respective found mapping relationships and the first weights corresponding to the respective found mapping relationships are as depicted in Table 4 below:

TABLE 4

| Status combination | Difference | First weight |
|---|---|---|
| 0101 | 10 w | 0.9 |
| 1100 | 0 w | 1 |
| 1101 | 20 w | 0.8 |

An operation 43 is to read the stored probable status combinations of the respective energy source consumption devices at a last moment of time;

Specifically, the stored probable status combinations of the four energy source consumption devices at a last moment of time and the first weights corresponding to the respective status combinations are read as depicted in Table 5 below:

TABLE 5

| Status combination | First weight |
|---|---|
| 1011 | 1 |
| 0110 | 0.9 |
| 0111 | 0.8 |

An operation 44 is to determine for each found mapping relationship the numbers of energy source consumption devices to be changed in status among the respective energy source consumption devices when the respective read status combinations are converted into the status combination in the found mapping relationship and to calculate a second weight corresponding to the found mapping relationship from the determined numbers; and when the second weight corresponding to the found mapping relationship is calculated, for each read status combination, the number of energy source consumption devices to be changed in status among the respective energy source consumption devices when the read status combination is converted into the status combination in the found mapping relationship are determined, and a third weight representing the probability that the respective energy source consumption devices undergo this status combination conversion is calculated from the determined number; and then the third weight representing the highest probability that a corresponding status combination conversion is performed is selected from the respective calculated third weights, and the second weight corresponding to the found mapping relationship is determined as the selected third weight;

Specifically for each mapping relationship in Table 4, the numbers of energy source consumption devices to be changed in status among the four energy source consumption devices when the respective read status combinations in Table 5 are converted into the status combination in the mapping relationship are as depicted in Table 6 below.

TABLE 6

|  | 0101 | 1100 | 1101 |
|---|---|---|---|
| 1011 | 3 | 3 | 2 |
| 0110 | 2 | 2 | 3 |
| 0111 | 1 | 3 | 2 |

Then the third weight representing the probability that the four energy source consumption devices undergo each status combination conversion is calculated using the function of Third Weight=1-(Number of Energy Source Consumption Devices to Be Changed in Status among Four Energy source Consumption Devices)/(Number of Energy source Consumption Devices), thus resulting in Table 7 below:

TABLE 7

|  | 0101 | 1100 | 1101 |
|---|---|---|---|
| 1011 | 0.25 | 0.25 | 0.5 |
| 0110 | 0.5 | 0.5 | 0.25 |
| 0111 | 0.75 | 0.25 | 0.5 |

Then for each column in Table 7 above, the largest third weight in the column is selected as the second weight of the corresponding status combination in Table 4 as depicted in Table 8 below:

TABLE 8

| Status combination | Second weight | Last status combination |
|---|---|---|
| 0101 | 0.75 | 0111 |
| 1100 | 0.5 | 0110 |
| 1101 | 0.5 | 1011 |

An operation 45 is to select the mapping relationship with the highest probability from the respective found mapping relationships according to the calculated first weights and second weights; and when the mapping relationship is selected, for each found mapping relationship, a fourth weight is calculated from the first weight and the second weight corresponding to the mapping relationship, and the mapping relationship with the highest corresponding final probability is selected from the respective found mapping relationships according to the calculated fourth weights;

Specifically for the status combination in each mapping relationship in Table 4, the sum of the first weight in Table 4, the first weight in Table 5 and the second weight in Table 8, all of which correspond to the status combination, is calculated as the fourth weight corresponding to the status combination as depicted in Table 9 below:

TABLE 9

| Status combination | Fourth weight |
|---|---|
| 0101 | 2.45 = (0.9 + 0.75 + 0.8) |
| 1100 | 2.4 = (1 + 0.5 + 0.9) |
| 1101 | 2.3 = (0.8 + 0.5 + 1) |

The status combination 0101 corresponding to the largest fourth weight is selected from Table 9 above; and An operation 46 is to determine the current statuses of the respective energy source consumption devices according to the status combination in the selected mapping relationship.

Specifically the statuses of the four energy source consumption devices are determined according to the status combination of 0101 as follows:

TABLE 10

| 1 | Lamp | On |
| 2 | Hairdryer | Off |
| 3 | Television | On |
| 4 | Fan | Off |

This embodiment ends.

Second Embodiment

Figure 5A:
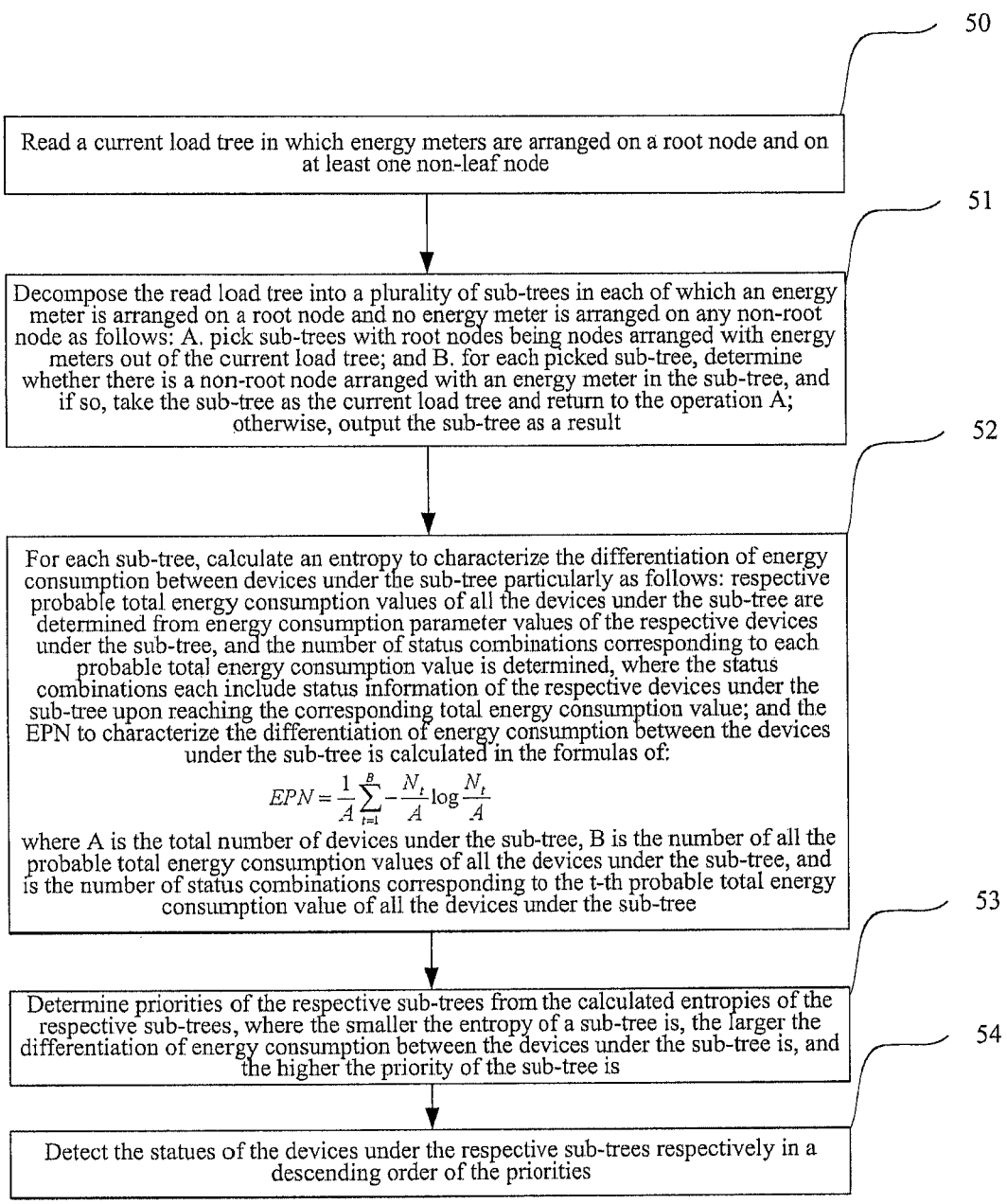
FIG. 5A is a schematic flow chart of detecting the statuses according to a second embodiment of the invention.
Figure 5B:
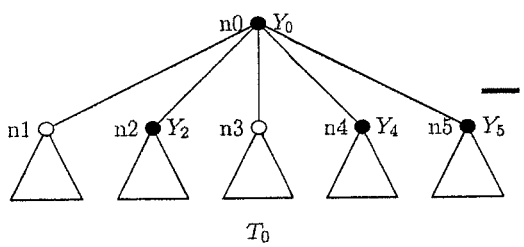
FIG. 5B to FIG. 5D are schematic structural diagrams of a load tree in the second embodiment of the invention.

As illustrated in FIG. 5A, a specific flow of detecting the statuses of energy source consumption devices is as follows:

An operation 50 is to read a current load tree with energy meters arranged on a root node and on at least one non-root node;

Specifically as illustrated in FIG. 5B, the read load tree includes a root node n0 and also 6 non-root nodes, i.e., n1, n2, n3, n4 and n5. There are power electricity meters arranged on n0, n2, n4 and n5, and a total power value measured by the power electricity meter on the node i is assumed as Yi;

An operation 51 is to decompose the read load tree into a plurality of sub-trees in each of which an energy meter is arranged on a root node and no energy meter is arranged on any non-root node as follows: A. the sub-trees with root nodes being nodes arranged with energy meters are picked out of the current load tree; and B. for each picked sub-tree, it is determined whether there is a non-root node arranged with an energy meter in the sub-tree, and if so, the sub-tree is taken as the current load tree, and the process returns to the operation A; otherwise, the sub-tree is outputted as a result.

Figure 5C:
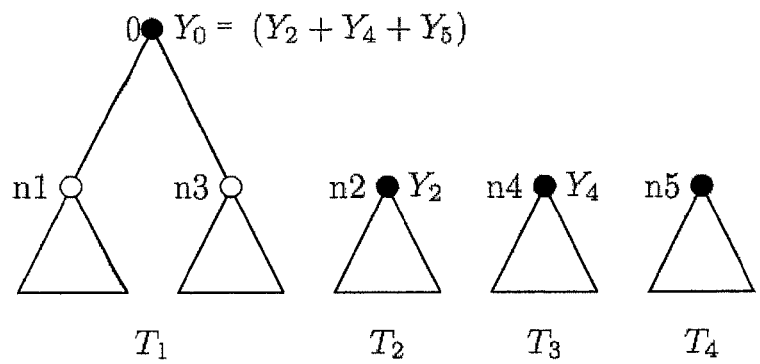

Specifically the read load tree is decomposed into 4 sub-trees as illustrated in FIG. 5C, i.e., T1, T2, T3 and T4 respectively;

An operation 52 is to calculate for each sub-tree an entropy to characterize the differentiation of energy consumption between energy source consumption devices under the sub-tree particularly as follows: respective probable total energy consumption values of all the energy source consumption devices under the sub-tree are determined from energy consumption parameter values of the respective energy source consumption devices under the sub-tree, and the number of status combinations corresponding to each probable total energy consumption value is determined, where the status combinations each include status information of the respective energy source consumption devices under the sub-tree upon reaching the corresponding total energy consumption value; and the EPN to characterize the differentiation of energy consumption between the energy source consumption devices under the sub-tree is calculated in the formulas of $$EPN = \frac{1}{A}\sum_{t=1}^{B} -\frac{N_t}{A}\log\frac{N_t}{A},$$

where A is the total number of energy source consumption devices under the sub-tree, B is the number of all the probable total energy consumption values of all the energy source consumption devices under the sub-tree, and $N_t$ is the number of status combinations corresponding to the t-th probable total energy consumption value of all the energy source consumption devices under the sub-tree.

Figure 5D:
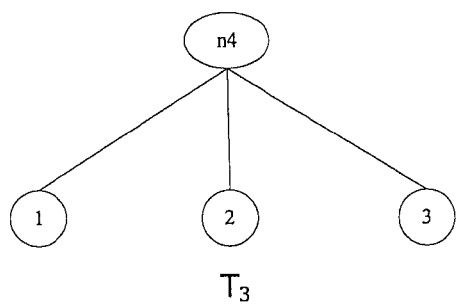

Particularly a description will be given taking the sub-tree T3 as an example:

As illustrated in FIG. 5D, given three energy source consumption devices under the sub-tree T3, power values of the respective energy source consumption devices are as depicted in Table 11 below:

TABLE 11

| Energy source consumption device ID | Power value |
|---|---|
| 1 | 10 w |
| 2 | 20 w |
| 3 | 10 w |

Respective probable total power values of all the energy source consumption devices under the sub-tree T3 are determined from the power values of the respective energy source consumption devices under the sub-tree T3, and the numbers of status combinations corresponding to the respective probable total power values are determined as depicted in Table 12 below:

TABLE 12

| Total power value | Number of status combination |
|---|---|
| 0 w | 1 |
| 10 w | 2 |
| 20 w | 2 |

TABLE 12-continued

| Total power value | Number of status combination |
|---|---|
| 30 w | 2 |
| 40 w | 1 |

The EPN to characterize the differentiation of energy consumption of the energy source consumption devices under the sub-tree T3 is calculated:

The calculation results of the respective sub-trees are as depicted in Table 13 below:

$$EPN(T_3) = 1/3 \sum_{s \in \{0,10,20,30,40\}} -\frac{N_{t,i}(s)}{3}\log\frac{N_{t,i}}{3} = -\frac{4}{3}\log\frac{2}{3} = 0.0783$$

TABLE 13

| Sub-tree | EPN |
|---|---|
| T1 | 0.22 |
| T2 | 0 |
| T3 | 0.0783 |
| T4 | 0.1 |

An operation 53 is to determine priorities of the respective sub-trees from the calculated entropies of the respective sub-trees, where the smaller the entropy of a sub-tree is, the larger the differentiation of energy consumption between the energy source consumption devices under the sub-tree is, and the higher the priority of the sub-tree is;

Particularly as depicted in Table 14 below:

TABLE 14

| Priority | Sub-tree |
|---|---|
| 1 | T2 |
| 2 | T3 |
| 3 | T4 |
| 4 | T1 |

An operation 54 is to detect the statues of the energy source consumption devices under the respective sub-trees respectively in a descending order of the priorities.

Specifically the statues of the energy source consumption devices under the sub-trees T2, T3, T4 and T1 respectively can be detected particularly in the method of detection according to the first embodiment.

This embodiment ends.

Figure 6:
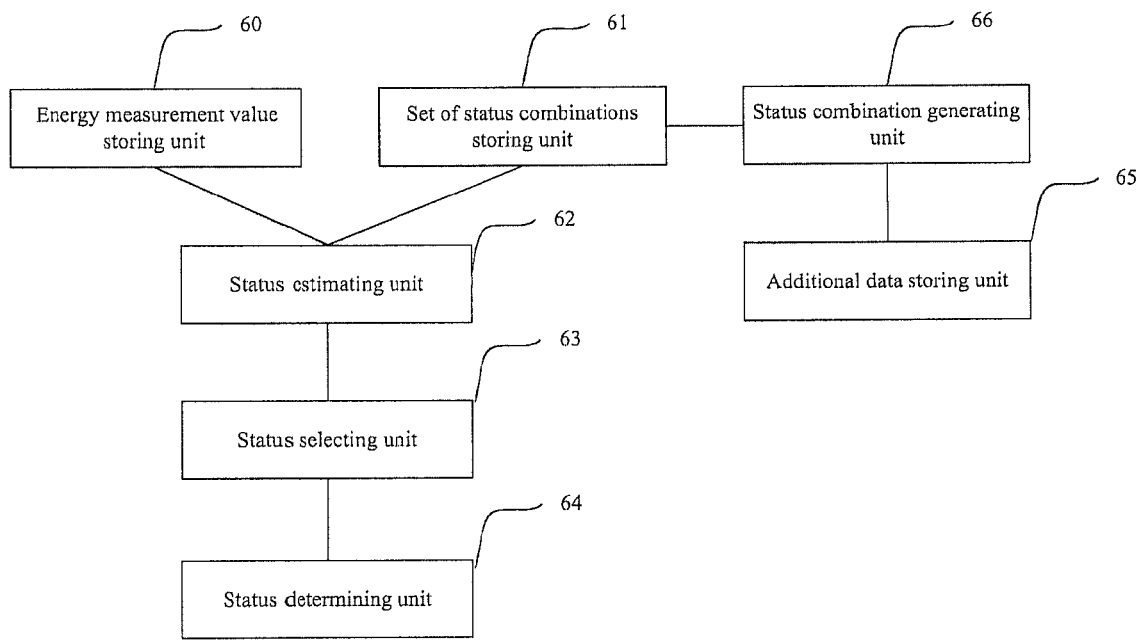
FIG. 6 is a schematic structural diagram of an apparatus according to an embodiment of the invention.

Referring to FIG. 6, an apparatus for detecting the statuses of energy source consumption devices according to an embodiment of the invention includes:

an energy measurement value storing unit 60 configured to store a total energy consumption value measured by an energy meter;

a set of status combinations storing unit 61 configured to store a set of status combinations preset for the energy meter, where the set of status combinations include mapping relationships between status combinations and total energy consumption values, the status combinations in the respective mapping relationships include status information of respective energy source consumption devices measured by the energy meter, and the total energy consumption values in the respective mapping relationships are total energy consumption values of the respective energy source consumption devices pre-estimated in the corresponding status combinations;

a status estimating unit 62 configured to read the total energy consumption value stored in the energy measurement value storing unit and the set of status combinations stored in the set of status combinations storing unit and to search the set of status combinations for mapping relationships in each of which the difference between the included total energy consumption value and the read total energy consumption value is below a predetermined threshold;

a status selecting unit 63 configured to select one of the found mapping relationships; and a status determining unit 64 configured to determine the current statuses of the respective energy source consumption devices according to the status combination in the selected mapping relationship.

Furthermore the apparatus further includes:

an additional data storing unit 65 configured to store energy consumption parameter values of the respective energy source consumption devices; and a status combination generating unit 66 configured to determine all probable status combinations of the respective energy source consumption devices, and for each determined status combination, to estimate a total energy consumption value of the respective energy source consumption devices in the status combination according to the energy consumption parameter values of the respective energy source consumption devices, and to store the mapping relationship between the status combination and the estimated total energy consumption value in the set of status combinations.

Furthermore the status combination generating unit 66 is further configured:

to sort the respective mapping relationships in an order of the magnitudes of the total energy consumption values in the respective mapping relationships in the set of status combinations after the mapping relationship between each determined status combination and the corresponding total energy consumption value is stored in the set of status combinations.

Furthermore the status selecting unit 63 is configured:

to calculate for each found mapping relationship a first weight corresponding to the mapping relationship according to the difference between the total energy consumption value in the mapping relationship and the read total energy consumption value, where the first weight represents the magnitude of the probability that a real current status combination of the respective energy source consumption devices is the status combination in the mapping relationship; and to select the mapping relationship with the highest probability from the respective found mapping relationships according to the calculated first weights.

Furthermore the status selecting unit 63 is configured: to read stored probable status combinations of the respective energy source consumption devices at a last moment of time;

to determine for each found mapping relationship the numbers of energy source consumption devices to be changed in status among the respective energy source consumption devices when the respective read status combinations are converted into the status combination in the mapping relationship and to calculate a second weight corresponding to the mapping relationship from the determined numbers, where the second weight represents the magnitude of the probability that a real current status combination of the respective energy source consumption devices is the status combination in the mapping relationship; and to select the mapping relationship with the highest probability from the respective found mapping relationships according to the calculated second weights.

Furthermore the status selecting unit 63 is configured:

to calculate for each found mapping relationship a first weight corresponding to the mapping relationship according to the difference between the total energy consumption value in the mapping relationship and the read total energy consumption value, where the first weight represents the magnitude of the probability that a real current status combination of the respective energy source consumption devices is the status combination in the mapping relationship;

to read the stored probable status combinations of the respective energy source consumption devices at a last moment of time, and for each found mapping relationship, to determine the numbers of energy source consumption devices to be changed in status among the respective energy source consumption devices when the respective read status combinations are converted into the status combination in the mapping relationship and to calculate a second weight corresponding to the mapping relationship from the determined numbers, where the second weight represents the magnitude of the probability that a real current status combination of the respective energy source consumption devices is the status combination in the mapping relationship; and to select the mapping relationship with the highest probability from the respective found mapping relationships according to the calculated first weights and second weights.

Furthermore the status selecting unit 63 is configured to calculate the second weight corresponding to the mapping relationship as follows:

for each read status combination, according to the number of energy source consumption devices to be changed in status among the respective energy source consumption devices when the read status combination is converted into the status combination in the found mapping relationship, a third weight representing the probability that the respective energy source consumption devices undergo this status combination conversion is calculated; and the third weight representing the highest probability that a corresponding status combination conversion is performed is selected from the respective calculated third weights and the second weight corresponding to the found mapping relationship is determined as the selected third weight.

Furthermore the status selecting unit 63 is configured to select the mapping relationship with the highest probability from the respective found mapping relationships as follows:

for each found mapping relationship, a fourth weight is calculated from the first weight and the second weight corresponding to the mapping relationship, where the fourth weight represents the magnitude of the final probability that the real current status combination of the respective energy source consumption devices is the status combination in the mapping relationship; and the mapping relationship with the highest corresponding final probability is selected from the respective found mapping relationships according to the calculated fourth weights.

Figure 7:
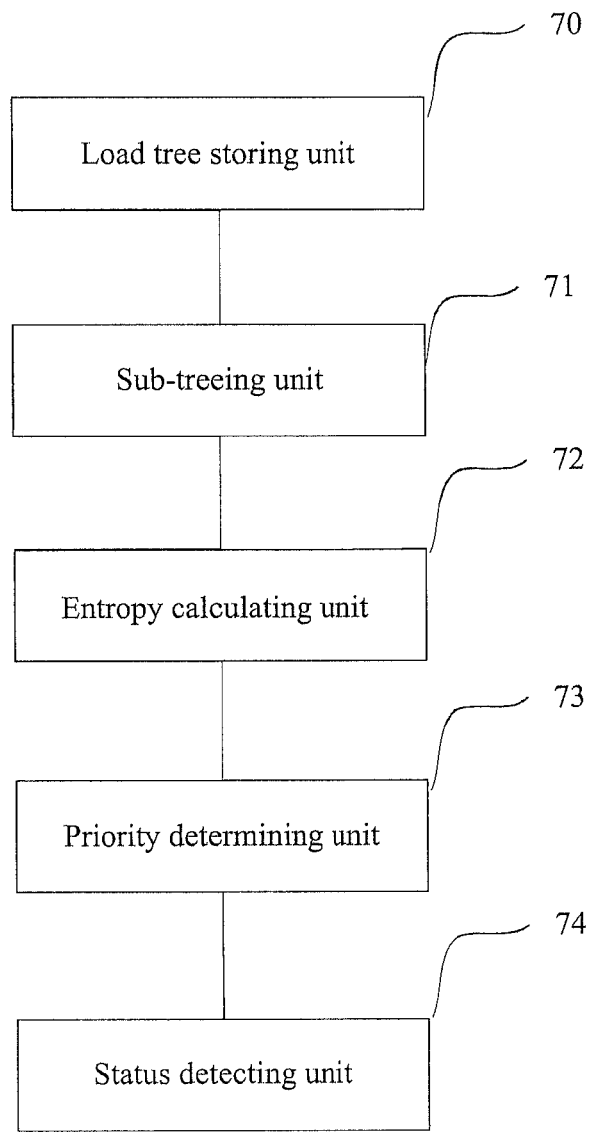
FIG. 7 is a schematic structural diagram of another apparatus according to an embodiment of the invention.

Referring to FIG. 7, an apparatus for detecting the statuses of energy source consumption devices according to an embodiment of the invention includes:

a load tree storing unit 70 configured to store a load tree with energy meters arranged on a root node and on at least one non-root node;

a sub-treeing unit 71 configured to read the load tree stored in the load tree storing unit and to decompose the read load tree into a plurality of sub-trees in each of which an energy meter is arranged on a root node and no energy meter is arranged on any non-root node;

an entropy calculating unit 72 configured, for each sub-tree, to calculate an entropy to characterize the differentiation of energy consumption between energy source consumption devices under the sub-tree;

a priority determining unit 73 configured to determine priorities of the respective sub-trees from the calculated entropies so that the sub-tree with the larger differentiation between the energy source consumption devices has a higher priority; and a status detecting unit 74 configured to detect the statues of the energy source consumption devices under the respective sub-trees respectively in a descending order of the priorities.

Furthermore the sub-treeing unit 71 is configured to decompose the read load tree into a plurality of sub-trees in the following operations:

A. The sub-trees with root nodes being nodes arranged with energy meters are picked out of the current load tree; and B. For each picked sub-tree, it is determined whether there is a non-root node arranged with an energy meter in the sub-tree, and if so, the sub-tree is taken as the current load tree, and the process returns to the operation A; otherwise, the sub-tree is outputted as a result.

Furthermore the entropy calculating unit 72 is configured to calculate the entropy to characterize the differentiation of energy consumption between the energy source consumption devices under the sub-tree as follows:

respective probable total energy consumption values of all the energy source consumption devices under the sub-tree are determined from energy consumption parameter values of the respective energy source consumption devices under the sub-tree, and the number of status combinations corresponding to each probable total energy consumption value is determined, where the status combinations each include status information of the respective energy source consumption devices under the sub-tree upon reaching the corresponding total energy consumption value; and the entropy (EPN) to characterize the differentiation of energy consumption between the energy source consumption devices under the sub-tree is calculated in the formulas of:

$$EPN = \frac{1}{A}\sum_{t=1}^{B} -\frac{N_t}{A}\log\frac{N_t}{A};$$

where A is the total number of energy source consumption devices under the sub-tree, B is the number of all the probable total energy consumption values of all the energy source consumption devices under the sub-tree, and $N_t$ is the number of status combinations corresponding to the t-th probable total energy consumption value of all the energy source consumption devices under the sub-tree.

Furthermore the status detecting unit 74 is configured to detect the statuses of the energy source consumption devices under the respective sub-trees as follows:

a total energy consumption value measured by the energy meter arranged on the root node of the current sub-tree and a set of status combinations preset for the energy meter are read, where the set of status combinations include mapping relationships between status combinations and total energy consumption values, the status combinations in the respective mapping relationships include status information of the respective energy source consumption devices measured by the energy meter, and the total energy consumption values in the respective mapping relationships are total energy consumption values of the respective energy source consumption devices pre-estimated in the corresponding status combinations;

the set of status combinations is searched for the mapping relationships in each of which the difference between the included total energy consumption value and the read total energy consumption value is below a predetermined threshold; and one of the found mapping relationships is selected, and the current statuses of the respective energy source consumption devices are determined according to the status combination in the selected mapping relationship.

Furthermore the status detecting unit 74 is further configured:

to determine all the probable status combinations of the respective energy source consumption devices; and to estimate for each determined status combination the total energy consumption value of the respective energy source consumption devices in the status combination according to energy consumption parameter values of the respective energy source consumption devices and store the mapping relationship between the status combination and the estimated total energy consumption value in the set of status combinations.

Furthermore the status detecting unit 74 is configured to select one of the found mapping relationships as follows:

for each found mapping relationship, a first weight corresponding to the mapping relationship is calculated according to the difference between the total energy consumption value in the mapping relationship and the read total energy consumption value, where the first weight represents the magnitude of the probability that a real current status combination of the respective energy source consumption devices is the status combination in the mapping relationship; and the mapping relationship with the highest probability is selected from the respective found mapping relationships according to the calculated first weights.

Furthermore the status detecting unit 74 is configured to select one of the found mapping relationships as follows:

the stored probable status combinations of the respective energy source consumption devices at a last moment of time are read;

for each found mapping relationship, the numbers of energy source consumption devices to be changed in status among the respective energy source consumption devices when the respective read status combinations are converted into the status combination in the mapping relationship are determined, and a second weight corresponding to the mapping relationship is calculated from the determined numbers, where the second weight represents the magnitude of the probability that a real current status combination of the respective energy source consumption devices is the status combination in the mapping relationship; and the mapping relationship with the highest probability is selected from the respective found mapping relationships according to the calculated second weights.

Furthermore the status detecting unit 74 is configured to select one of the found mapping relationships as follows:

for each found mapping relationship, a first weight corresponding to the mapping relationship is calculated according to the difference between the total energy consumption value in the mapping relationship and the read total energy consumption value, where the first weight represents the magnitude of the probability that a real current status combination of the respective energy source consumption devices is the status combination in the mapping relationship;

the stored probable status combinations of the respective energy source consumption devices at a last moment of time are read, and for each found mapping relationship, the numbers of energy source consumption devices to be changed in status among the respective energy source consumption devices when the respective read status combinations are converted into the status combination in the mapping relationship are determined, and a second weight corresponding to the mapping relationship is calculated from the determined numbers, where the second weight represents the magnitude of the probability that a real current status combination of the respective energy source consumption devices is the status combination in the mapping relationship; and the mapping relationship with the highest probability is selected from the respective found mapping relationships according to the calculated first weights and second weights.

In summary, the embodiments of the invention have the following advantageous effects:

In a solution according to an embodiment of the invention, mapping relationships between status combinations of respective energy source consumption devices measured by an energy meter and total energy consumption values of the respective energy source consumption devices in the status combinations are generated and stored in advance, and when the statuses of the respective energy source consumption devices are detected, the mapping relationships are directly searched for in each of which the difference between the included total energy consumption value and a total energy consumption value measured by the energy meter is below a predetermined threshold, and the current statuses of the respective energy source consumption devices are determined according to the status combination in one of the found mapping relationships. As compared with the prior art, this solution dispenses with a number of feedback loops to thereby improve significantly the efficiency of detecting the statuses of the energy source consumption devices.

In another solution according to an embodiment of the invention, a load tree is decomposed into sub-trees with energy meters arranged only on root nodes; then for each sub-tree, an entropy is calculated to characterize the differentiation of energy consumption between energy source consumption devices under the sub-tree, and priorities of the respective sub-trees are determined from the calculated entropies so that the sub-tree with the larger differentiation between the energy source consumption devices has a higher priority; and next the statues of the energy source consumption devices under the respective sub-trees are detected respectively in a descending order of the priorities. Since the statuses of the energy source consumption devices with larger differentiation of energy consumption are detected at a higher accuracy, this solution detects the statuses of the energy source consumption devices preferentially for the sub-tree with larger differentiation of energy consumption between the energy source consumption devices and can avoid an error of detecting the statuses of the energy source consumption devices from being passed to thereby improve the accuracy of detecting the statuses of the energy source consumption devices.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for detecting the statuses of energy source consumption devices, comprising:
    reading a total energy consumption value measured by an energy meter and a set of status combinations preset for the energy meter, wherein the set of status combinations include mapping relationships between status combinations and total energy consumption values, the status combinations in the respective mapping relationships include status information of respective energy source consumption devices measured by the energy meter, and the total energy consumption values in the respective mapping relationships are total energy consumption values of the respective energy source consumption devices pre-estimated in the corresponding status combinations;
    searching the set of status combinations for mapping relationships in each of which the difference between a total energy consumption value included in the mapping relationship and the read total energy consumption value is below a predetermined threshold; and
    selecting one of the found mapping relationships, and determining the current statuses of the respective energy source consumption devices according to a status combination in the selected mapping relationship.

2. The method of claim 1, wherein before the total energy consumption value measured by the energy meter and the set of status combinations preset for the energy meter are read, the method further comprises:
    determining all probable status combinations of the respective energy source consumption devices; and
    for each determined status combination, estimating a total energy consumption value of the respective energy source consumption devices in the status combination according to energy consumption parameter values of the respective energy source consumption devices, and storing the mapping relationship between the status combination and the estimated total energy consumption value in the set of status combinations.

3. The method of claim 2, wherein after the mapping relationship between each determined status combination and the corresponding total energy consumption value is stored in the set of status combinations, the method further comprises:
    sorting the respective mapping relationships in an order of the magnitudes of the total energy consumption values in the respective mapping relationships in the set of status combinations.

4. The method of claim 1, wherein the selecting one of the found mapping relationships comprises:
    for each found mapping relationship, calculating a first weight corresponding to the mapping relationship according to the difference between the total energy consumption value in the mapping relationship and the read total energy consumption value, wherein the first weight represents the magnitude of the probability that a real current status combination of the respective energy source consumption devices is the status combination in the mapping relationship; and
    selecting the mapping relationship with the highest probability from the respective found mapping relationships according to the calculated first weights.

5. The method of claim 1, wherein the selecting one of the found mapping relationships comprises:
    reading stored probable status combinations of the respective energy source consumption devices at a last moment of time;
    for each found mapping relationship, determining the numbers of energy source consumption devices to be changed in status among the respective energy source consumption devices when the respective read status combinations are converted into the status combination in the mapping relationship, and calculating a second weight corresponding to the mapping relationship from the determined numbers, wherein the second weight represents the magnitude of the probability that a real current status combination of the respective energy source consumption devices is the status combination in the mapping relationship; and
    selecting the mapping relationship with the highest probability from the respective found mapping relationships according to the calculated second weights.

6. The method of claim 5, wherein the calculating the second weight corresponding to the mapping relationship comprises:
    for each read status combination, according to the number of energy source consumption devices to be changed in status among the respective energy source consumption devices when the read status combination is converted into the status combination in the mapping relationship, determining a third weight representing the probability that the respective energy source consumption devices undergo the status combination conversion; and
    selecting a third weight representing the highest probability that a corresponding status combination conversion is performed from the respective calculated third weights, and determining the second weight corresponding to the mapping relationship as the selected third weight.

7. The method of claim 1, wherein the selecting one of the found mapping relationships comprises:
for each found mapping relationship, calculating a first weight corresponding to the mapping relationship according to the difference between the total energy consumption value in the mapping relationship and the read total energy consumption value, wherein the first weight represents the magnitude of the probability that a real current status combination of the respective energy source consumption devices is the status combination in the mapping relationship;
reading stored probable status combinations of the respective energy source consumption devices at a last moment of time, and for each found mapping relationship, determining the numbers of energy source consumption devices to be changed in status among the respective energy source consumption devices when the respective read status combinations are converted into the status combination in the mapping relationship, and calculating a second weight corresponding to the mapping relationship from the determined numbers, wherein the second weight represents the magnitude of the probability that the real current status combination of the respective energy source consumption devices is the status combination in the mapping relationship; and
selecting the mapping relationship with the highest probability from the respective found mapping relationships according to the calculated first weights and second weights.

8. The method of claim 7, wherein the selecting the mapping relationship with the highest probability from the respective found mapping relationships according to the calculated first weights and second weights comprises:
for each found mapping relationship, calculating a fourth weight from the first weight and the second weight corresponding to the mapping relationship, wherein the fourth weight represents the magnitude of the final probability that the real current status combination of the respective energy source consumption devices is the status combination in the mapping relationship; and
selecting the mapping relationship with the highest corresponding final probability from the respective found mapping relationships according to the calculated fourth weights.

9. A method for detecting the statuses of energy source consumption devices, comprising:
reading a current load tree in which energy meters are arranged on a root node and on at least one non-root node;
decomposing the read load tree into a plurality of sub-trees in each of which an energy meter is arranged on a root node and no energy meter is arranged on any non-root node;
for each sub-tree, calculating an entropy to characterize the differentiation of energy consumption between energy source consumption devices under the sub-tree, and determining priorities of the respective sub-trees from the calculated entropies so that the sub-tree with the larger differentiation of energy consumption between the energy source consumption devices has a higher priority; and
detecting the statues of the energy source consumption devices under the respective sub-trees respectively in a descending order of the priorities.

10. The method of claim 9, wherein the decomposing the read load tree into a plurality of sub-trees comprising:
A. picking sub-trees with root nodes being nodes arranged with energy meters out of the current load tree; and
B. for each picked sub-tree, determining whether there is a non-root node arranged with an energy meter in the sub-tree, and if so, then taking the sub-tree as the current load tree and returning to the operation A; otherwise, outputting the sub-tree as a result.

11. The method of claim 9, wherein the calculating the entropy to characterize the differentiation of energy consumption between the energy source consumption devices under the sub-tree comprises:
determining respective probable total energy consumption values of all the energy source consumption devices under the sub-tree according to energy consumption parameter values of the respective energy source consumption devices under the sub-tree, and determining the number of status combinations corresponding to each probable total energy consumption value, wherein the status combinations each include status information of the respective energy source consumption devices under the sub-tree upon reaching the corresponding total energy consumption value; and
calculating the entropy EPN to characterize the differentiation of energy consumption between the energy source consumption devices under the sub-tree in the formulas of:

$$EPN = \frac{1}{A}\sum_{t=1}^{B} -\frac{N_t}{A}\log\frac{N_t}{A};$$

wherein A is the total number of energy source consumption devices under the sub-tree, B is the number of all the probable total energy consumption values of all the energy source consumption devices under the sub-tree, and $N_t$ is the number of status combinations corresponding to the t-th probable total energy consumption value of all the energy source consumption devices under the sub-tree.

12. The method of claim 9, wherein the detecting the statuses of the energy source consumption devices under the respective sub-trees comprising:
reading a total energy consumption value measured by the energy meter arranged on the root node of the current sub-tree and a set of status combinations preset for the energy meter, wherein the set of status combinations include mapping relationships between status combinations and total energy consumption values, the status combinations in the respective mapping relationships include status information of the respective energy source consumption devices measured by the energy meter, and the total energy consumption values in the respective mapping relationships are total energy consumption values of the respective energy source consumption devices pre-estimated in the corresponding status combinations;
searching the set of status combinations for mapping relationships in each of which the difference between a total energy consumption value included in the mapping relationship and the read total energy consumption value is below a predetermined threshold; and
selecting one of the found mapping relationships, and determining the current statuses of the respective energy source consumption devices according to a status combination in the selected mapping relationship.

13. The method of claim 12, wherein before the total energy consumption value measured by the energy meter and the set of status combinations preset for the energy meter are read, the method further comprises:
    determining all probable status combinations of the respective energy source consumption devices; and
    for each determined status combination, estimating a total energy consumption value of the respective energy source consumption devices in the status combination according to energy consumption parameter values of the respective energy source consumption devices, and storing the mapping relationship between the status combination and the estimated total energy consumption value in the set of status combinations.

14. The method of claim 12, wherein the selecting one of the found mapping relationships comprises:
    for each found mapping relationship, calculating a first weight corresponding to the mapping relationship according to the difference between the total energy consumption value in the mapping relationship and the read total energy consumption value, wherein the first weight represents the magnitude of the probability that a real current status combination of the respective energy source consumption devices is the status combination in the mapping relationship; and
    selecting the mapping relationship with the highest probability from the respective found mapping relationships according to the calculated first weights.

15. The method of claim 12, wherein the selecting one of the found mapping relationships comprises:
    reading stored probable status combinations of the respective energy source consumption devices at a last moment of time;
    for each found mapping relationship, determining the numbers of energy source consumption devices to be changed in status among the respective energy source consumption devices when the respective read status combinations are converted into the status combination in the mapping relationship, and calculating a second weight corresponding to the mapping relationship from the determined numbers, wherein the second weight represents the magnitude of the probability that a real current status combination of the respective energy source consumption devices is the status combination in the mapping relationship; and
    selecting the mapping relationship with the highest probability from the respective found mapping relationships according to the calculated second weights.

16. The method of claim 12, wherein the selecting one of the found mapping relationships comprises:
    for each found mapping relationship, calculating a first weight corresponding to the mapping relationship according to the difference between the total energy consumption value in the mapping relationship and the read total energy consumption value, wherein the first weight represents the magnitude of the probability that a real current status combination of the respective energy source consumption devices is the status combination in the mapping relationship;
    reading stored probable status combinations of the respective energy source consumption devices at a last moment of time, and for each found mapping relationship, determining the numbers of energy source consumption devices to be changed in status among the respective energy source consumption devices when the respective read status combinations are converted into the status combination in the mapping relationship, and calculating a second weight corresponding to the mapping relationship from the determined numbers, wherein the second weight represents the magnitude of the probability that the real current status combination of the respective energy source consumption devices is the status combination in the mapping relationship; and
    selecting the mapping relationship with the highest probability from the respective found mapping relationships according to the calculated first weights and second weights.

17. An apparatus for detecting the statuses of energy source consumption devices, comprising:
    a load tree storing unit configured to store a load tree in which energy meters are arranged on a root node and on at least one non-root node;
    a sub-treeing unit configured to read the load tree stored in the load tree storing unit and to decompose the read load tree into a plurality of sub-trees in each of which an energy meter is arranged on a root node and no energy meter is arranged on any non-root node;
    an entropy calculating unit configured, for each sub-tree, to calculate an entropy to characterize the differentiation of energy consumption between energy source consumption devices under the sub-tree;
    a priority determining unit configured to determine priorities of the respective sub-trees from the calculated entropies so that the sub-tree with the larger differentiation of energy consumption between the energy source consumption devices has a higher priority; and
    a status detecting unit configured to detect the statues of the energy source consumption devices under the respective sub-trees respectively in a descending order of the priorities.

18. The apparatus of claim 17, wherein the sub-treeing unit is configured to decompose the read load tree into a plurality of sub-trees in operations of:
    A. picking sub-trees with root nodes being nodes arranged with energy meters out of the current load tree; and
    B. for each picked sub-tree, determining whether there is a non-root node arranged with an energy meter in the sub-tree, and if so, then taking the sub-tree as the current load tree and returning to the operation A; otherwise, outputting the sub-tree as a result.

19. The apparatus of claim 17, wherein the entropy calculating unit is configured to calculate the entropy to characterize the differentiation of energy consumption between the energy source consumption devices under the sub-tree as follows:
    respective probable total energy consumption values of all the energy source consumption devices under the sub-tree are determined from energy consumption parameter values of the respective energy source consumption devices under the sub-tree, and the number of status combinations corresponding to each probable total energy consumption value is determined, wherein the status combinations each include status information of the respective energy source consumption devices under the sub-tree upon reaching the corresponding total energy consumption value; and
    the entropy EPN to characterize the differentiation of energy consumption between the energy source consumption devices under the sub-tree is calculated in the formulas of:

$$EPN = \frac{1}{A}\sum_{t=1}^{B} -\frac{N_t}{A}\log\frac{N_t}{A};$$

wherein A is the total number of energy source consumption devices under the sub-tree, B is the number of all the probable total energy consumption values of all the energy source consumption devices under the sub-tree, and $N_t$ is the number of status combinations corresponding to the t-th probable total energy consumption value of all the energy source consumption devices under the sub-tree.

20. The apparatus of claim 17, wherein the status detecting unit is configured to detect the statuses of the energy source consumption devices under the respective sub-trees as follows:
   a total energy consumption value measured by the energy meter arranged on the root node of the current sub-tree and a set of status combinations preset for the energy meter are read, wherein the set of status combinations include mapping relationships between status combinations and total energy consumption values, the status combinations in the respective mapping relationships include status information of the respective energy source consumption devices measured by the energy meter, and the total energy consumption values in the respective mapping relationships are total energy consumption values of the respective energy source consumption devices pre-estimated in the corresponding status combinations;
   the set of status combinations is searched for mapping relationships in each of which the difference between a total energy consumption value included in the mapping relationship and the read total energy consumption value is below a predetermined threshold; and
   one of the found mapping relationships is selected, and the current statuses of the respective energy source consumption devices are determined according to a status combination in the selected mapping relationship.

21. The apparatus of claim 20, wherein the status detecting unit is further configured:
   to determine all probable status combinations of the respective energy source consumption devices; and
   to estimate for each determined status combination a total energy consumption value of the respective energy source consumption devices in the status combination according to energy consumption parameter values of the respective energy source consumption devices and store the mapping relationship between the status combination and the estimated total energy consumption value in the set of status combinations.

22. The apparatus of claim 20, wherein the status detecting unit is configured to select one of the found mapping relationships as follows:
   for each found mapping relationship, a first weight corresponding to the mapping relationship is calculated according to the difference between the total energy consumption value in the mapping relationship and the read total energy consumption value, wherein the first weight represents the magnitude of the probability that a real current status combination of the respective energy source consumption devices is the status combination in the mapping relationship; and
   the mapping relationship with the highest probability is selected from the respective found mapping relationships according to the calculated first weights.

23. The apparatus of claim 20, wherein the status detecting unit is configured to select one of the found mapping relationships as follows:
   stored probable status combinations of the respective energy source consumption devices at a last moment of time are read;
   for each found mapping relationship, the numbers of energy source consumption devices to be changed in status among the respective energy source consumption devices when the respective read status combinations are converted into the status combination in the mapping relationship are determined, and a second weight corresponding to the mapping relationship is calculated from the determined numbers, wherein the second weight represents the magnitude of the probability that a real current status combination of the respective energy source consumption devices is the status combination in the mapping relationship; and
   the mapping relationship with the highest probability is selected from the respective found mapping relationships according to the calculated second weights.

24. The apparatus of claim 20, wherein the status detecting unit is configured to select one of the found mapping relationships as follows:
   for each found mapping relationship, a first weight corresponding to the mapping relationship is calculated according to the difference between the total energy consumption value in the mapping relationship and the read total energy consumption value, wherein the first weight represents the magnitude of the probability that a real current status combination of the respective energy source consumption devices is the status combination in the mapping relationship;
   stored probable status combinations of the respective energy source consumption devices at a last moment of time are read, and for each found mapping relationship, the numbers of energy source consumption devices to be changed in status among the respective energy source consumption devices when the respective read status combinations are converted into the status combination in the mapping relationship are determined, and a second weight corresponding to the mapping relationship is calculated from the determined numbers, wherein the second weight represents the magnitude of the probability that the real current status combination of the respective energy source consumption devices is the status combination in the mapping relationship; and
   the mapping relationship with the highest probability is selected from the respective found mapping relationships according to the calculated first weights and second weights.

\* \* \* \* \*